United States Patent
Denton et al.

[15] 3,659,696
[45] May 2, 1972

[54] LIVE ROLLER CONVEYOR

[72] Inventors: Cecil S. Denton, Louisville, Ky.; Frank D. Denzler, Jeffersonville, Ind.

[73] Assignee: General Electric Company

[22] Filed: Sept. 9, 1970

[21] Appl. No.: 70,683

[52] U.S. Cl. ................................................198/127
[51] Int. Cl. .................................................B65g 13/02
[58] Field of Search ....................................198/127

[56] References Cited

UNITED STATES PATENTS 1,919,837   7/1933   Gotthardt ..........................198/127

Primary Examiner—Edward A. Sroka
Attorney—Walter E. Rule, Francis H. Boos, Jr., Frank L. Neuhauser, Oscar B. Waddell and Joseph B. Forman

[57] ABSTRACT

A belt-driven live roller conveyor in which the drive area is separated from the conveyor area by a longitudinally extending guide member. A drive belt is disposed above the rollers with its lower drive pass engaging the upper surface of the rollers in the drive area. Spaced pressure members are removably positioned on the belt in the drive area, these members comprising a pair of spaced rolls riding on the drive belt pass and a frame supporting the rolls in spaced relationship so that they bridge at least one conveyor roller. Means are also provided for preventing the pressure members from traveling with the belt.

5 Claims, 5 Drawing Figures

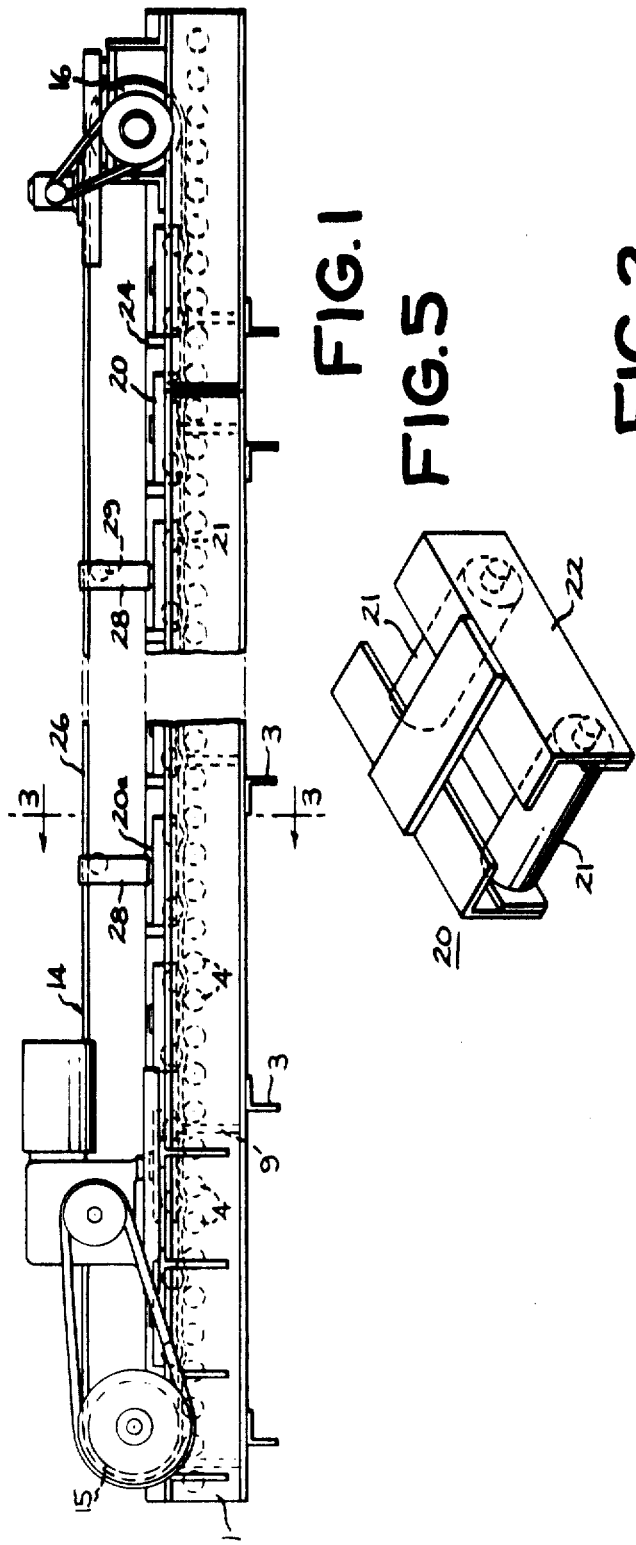
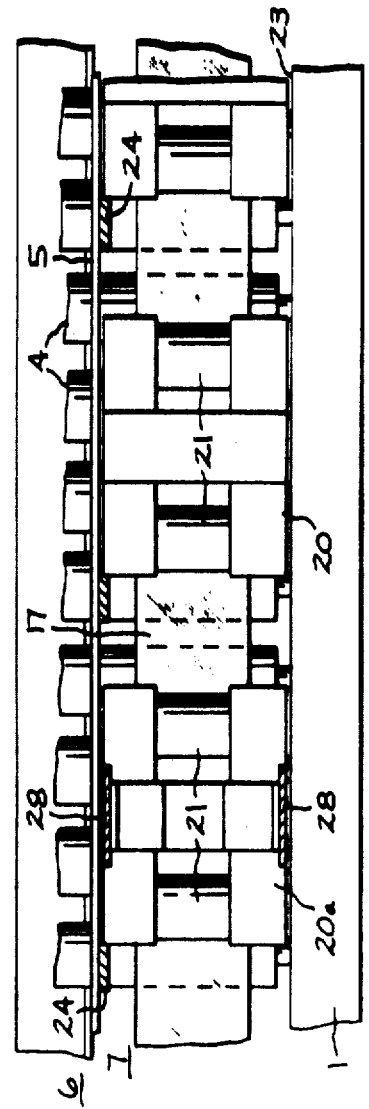

INVENTORS
CECIL S. DENTON
FRANK D. DENZLER
BY
*Walter E. Rule*
THEIR ATTORNEY

LIVE ROLLER CONVEYOR

BACKGROUND OF THE INVENTION

The present invention is concerned with live roller conveyors in which most or all of the rollers forming the conveying surface are belt driven by a drive belt arranged above the rollers with the lower run forming the drive pass engaging upper end portions of the conveyor rollers. A longitudinally extending guide member separates these end or drive portions of the rollers from the remaining portions forming the load transferring or conveyor area.

In known conveyors of this type, idler or tension rolls for maintaining the belt in driving engagement with the rollers have been mounted on shafts, the opposite ends of which have been secured to the guide member and the adjacent frame portion of the conveyor unit as shown for example in FIG. 7 of U.S. Pat. No. 1,919,837 Gotthardt. Such fixed idler or tension rolls have a number of disadvantages. They include no provision for varying the tension provided thereby and in replacing the drive belt, they must be removed or the belt split and threaded between the rollers and tension rolls. In addition, the conveyor cannot be wholly or partially converted to a gravity conveyor without stopping the drive belt and mechanically disconnecting the tension rolls from their supports. Another means for increasing the belt driving force imparted to the rollers is disclosed in U.S. Pat. No. 3,040,872 Hohl. This means comprises a plurality of weight members superposed on the belt drive pass for pressing the belt against the rollers. Such weight members have the disadvantage of continuously sliding on the belt, the resultant friction reducing the belt drive force imparted to the rollers. In addition, the weight members provide only a radial or line contact of the belt and rollers.

STATEMENT OF THE INVENTION

A general object of the present invention is to provide a belt-driven live roller conveyor in which the belt drive pass engaging the upper surface of the rollers is maintained in frictional engagement with the rollers by means of pressure members which are not mechanically connected to the conveyor structure.

Another object of the invention is to provide a belt-driven live roller conveyor including a belt drive pass engaging the upper surface of the rollers and pressure members for maintaining the drive pass in engagement with the rollers, which members are quickly removable from the belt area.

A further object of the invention is to provide a live roller conveyor unit of the belt driven type including a belt drive pass engaging the upper surface of the rollers and a plurality of pressure members for maintaining the belt in driving engagement with the rollers so constructed that the number of pressure members employed can be quickly varied in order to control the transporting forces of the conveyor unit.

In accordance with the illustrated embodiment of the present invention, there is provided a live roller conveyor comprising a series of spaced parallel and laterally disposed rollers forming a planar surface and a longitudinally extending guide member dividing that surface into a conveyor area and a drive area. A drive belt is positioned above the rollers with its lower drive pass resting on the upper surfaces of the rollers in the drive area. For the purpose of maintaining the belt drive pass in driving engagement with some or all of the rollers, there are provided a plurality of pressure members each of which comprises a pair of spaced rolls adapted to ride on the belt drive pass and a frame supporting the rolls in spaced relationship such that the rolls bridge at least one conveyor roller. The pressure members are laterally maintained in position by the guide member and an upstanding member on the conveyor structure on the opposite side of the belt from the guide members and are prevented from traveling with the belt by stops or projections on one of these members.

BRIEF DESCRIPTION OF THE DRAWING

In the accompanying drawing:

FIG. 1 is an elevational view of a live roller conveyor incorporating the present invention;

FIG. 2 is a plan view of a portion of the conveyor shown in FIG. 1;

FIG. 5 is a perspective view of one of the pressure members employed in the practice of the present invention.

Figure 3:
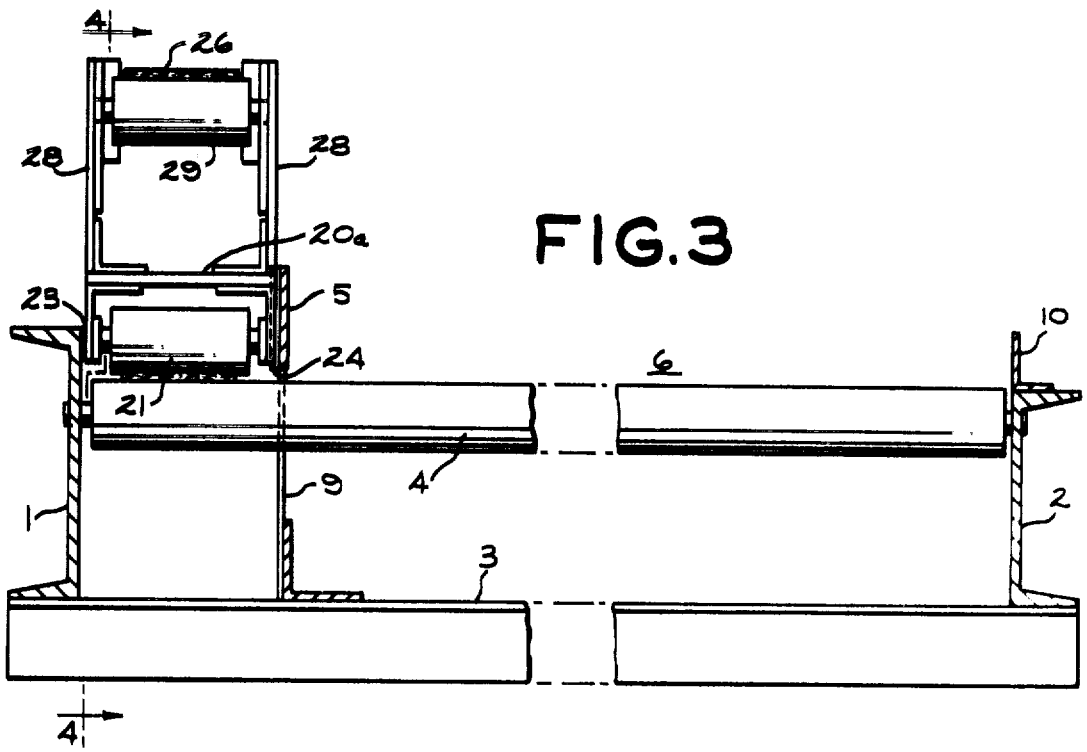
FIG. 3 is a sectional view taken along line 3—3 of FIG. 1.

With reference to the drawing and particularly FIGS. 1 and 3 thereof, there is illustrated a conveyor unit comprising spaced frame members 1 and 2 joined together at the ends by cross members 3. A plurality of laterally extending and longitudinally spaced live rollers 4 are journalled between the support members 1 and 2, these live rollers 4 forming a planar surface extending substantially the full length of the conveyor unit.

As shown particularly in FIGS. 2 and 3 of the drawing, this planar surface is divided by a longitudinally extending guide member 5 into a conveyor area generally indicated by the numeral 6 and a drive area generally indicated by the numeral 7. More specifically, the guide member 5 extends substantially the full length of the conveyor unit above the rollers 4 and in spaced relationship to the frame member 1 to form a channel shaped drive area. The guide member 5 is suitably supported on the cross members 3 by a plurality of supports 9 extending upwardly between some of the rollers 4. The guide member 5 and a similar guide member 10 extending upwardly from the frame member 2 define the longitudinal edges or sides of the conveyor area.

The rollers 4 are powered by means of a belt drive including a belt 14, a drive pulley 15 and an idler or return pulley 16, the pulleys 15 and 16 being respectively mounted on the opposite ends of the conveyor unit in line with the drive area 7 so that the lower or drive pass 17 of the belt engages the upper surfaces of the rollers. Preferably the lower surfaces of pulleys 15 and 16 are positioned relative to the upper surfaces of rollers 4 so that the belt merely rests on the rollers. In other words, the lower surface of the drive pass 17, if droopless, would be in the same plane as the upper surfaces of the rollers 4.

In accordance with the present invention, new and improved means are provided for effecting the desired frictional engagement of the belt drive pass 17 with the rollers 4. These pressure means, generally indicated by the numeral 20, each comprises a pair of laterally extending rolls 21 mounted on a generally rectangular frame member 22, the rolls 21 being spaced apart a distance such that they will bridge at least one and preferably two rollers 4 when placed on the drive pass 17 within the drive area 7. As is shown particularly in FIGS. 2 and 3 of the drawing, the pressure members 20 are adapted to be rather loosely confined laterally within the channel shaped drive area defined by the guide 5 and the upwardly extending portion 23 of the frame member 1. A clearance of one-fourth inch between the sides of the channel and the pressure member is adequate.

Figure 4:
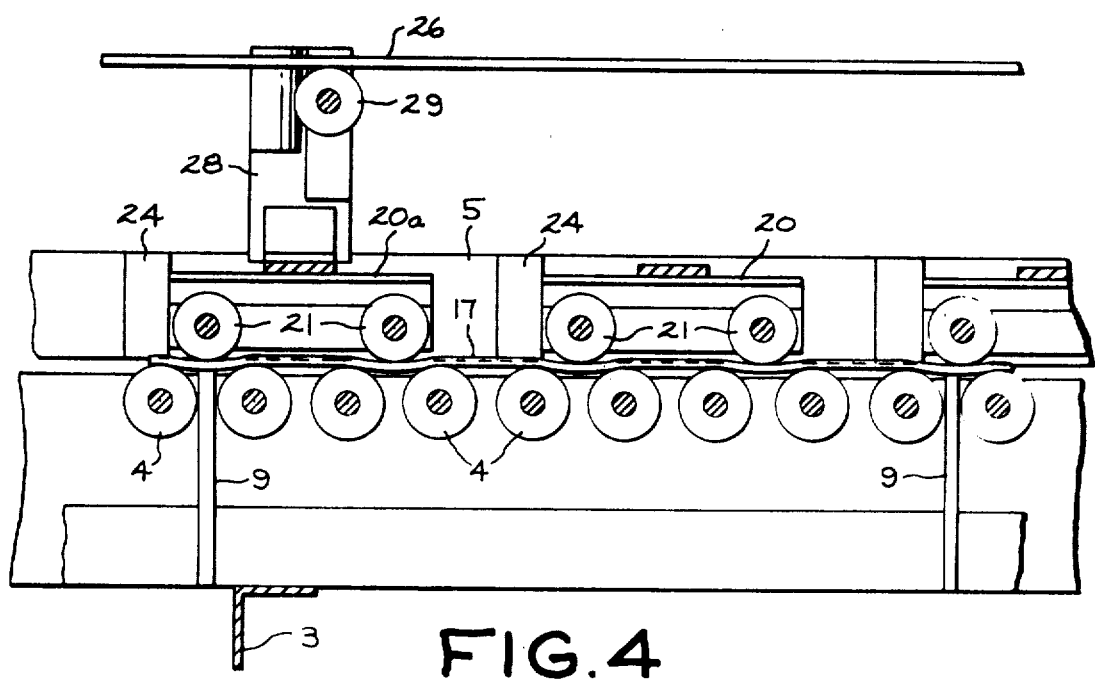
FIG. 4 is a sectional view taken along line 4—4 of FIG. 3.

In order to prevent these pressure members 20, which are not directly or mechanically connected to the remaining conveyor structure, i.e. are freely riding, from riding with the belt, stop means such as projections 24 are positioned on the drive area side of the guide member 5, or alternatively on the upper portion 23 of the frame member 1. These stop members 24 are positioned to be engaged by a corner portion of a pressure member when the pressure member rolls 21 respectively engaging the belt drive pass 17 midway between two adjacent conveyor rollers 4 as illustrated in FIG. 4 of the drawing. Thus, each pressure member serves to increase belt contact with a plurality of rollers since the action of each of the two rolls 21 in each pressure member is to depress the drive pass of the belt into arcuate contact with two adjacent rollers thereby increasing the arcuate contact area and frictional engagement of the belt with a total of three or four rollers.

Preferably some of the pressure members, as for example every fourth or fifth pressure member such as those indicated by the numeral 20a also include means for supporting the return pass or run 26 of the drive belt 14. To this end, these pressure members 20a include upwardly extending spaced arms 28 having at their upper ends means, such as a roll 29, on which the return belt pass 26 rides.

It will be noted that the pressure members are not mechanically connected to any remaining portions of the conveyor structure or in other words they are laterally positioned on the belt pass solely by the guide member 5 and the upper portion 23 of the frame member 1 and are longitudinally positioned by the stops 24. Thus, they can be quickly and easily manually positioned within the drive area or removed therefrom.

This feature provides a number of advantages. If it is necessary to remove or replace a belt, all of the pressure members can be lifted from the drive area channel in a matter of minutes with the result that the entire belt area is completely accessible. An endless belt can then be quickly removed from the drive and idler pulleys or placed thereon without being split. Further, it is not necessary to thread the belt between the conveyor rollers and idler rolls as has been required in the previously known conveyor structures featuring fixed idler rolls.

In addition, the driving belt contact provided by the pressure members is, within limits, substantially independent of the belt tension provided by the positioning of pulleys 15 and 16. Thus, the pressure members 20 will maintain substantially uniform driving engagement of the belt with the rollers 4 regardless of changes in the belt length due for example to changes in atmospheric temperature or humidity.

In addition, the ease with which the pressure members can be manually removed or replaced permits a quick adjustment or change in the transport forces provided by a given unit. For example, the removal of every other pressure member decreases the total force on the belt to that provided by the weight of the remaining pressure members with the result that the total transporting force of the unit is proportionately diminished, those conveyor rollers which are not provided with the pressure members in effect becoming idler rollers.

The ease with which the total unit driving force can be varied is an advantage if a back-up of transported articles downstream from a unit causes the articles to accumulate on the unit. A suitable number of pressure members can be quickly removed therefrom to decrease the driving pressure on the stalled articles until the block has been cleared. The removal of all of the pressure members under such circumstances practically converts the unit from a powered conveyor to a gravity conveyor. In this same manner, the number of pressure members employed on a given unit may be selected so as to obtain a total transporting force which will protect particular articles or cartons being transported in accordance with their ability to resist the transporting forces.

While there has been shown and described a particular embodiment of the invention, it will be understood that it is not limited thereto and it is intended by the appended claims to cover all such modifications as fall within the true spirit and scope of the invention.

What we claim as new and desire to secure by Letters Patents of the United States is:

1. A live roller conveyor including a plurality of rollers comprising main portions forming a load conveying path and end portions forming a drive path;
   a drive belt having a drive pass engaging the upper surfaces of the portions of said rollers forming said drive path;
   at least one pressure member for effecting driving engagement of said drive pass with a plurality of adjacent rollers, said pressure member being freely riding, and manually removable, and comprising a frame and spaced rolls supported by said frame for engaging the upper surface of said belt drive pass, said rolls being spaced to bridge at least one roller;
   spaced guide means for laterally positioning said pressure member on said belt; and
   stop means engaging said pressure member frame for preventing said pressure member from traveling with said belt.

2. A conveyor according to claim 1 in which said rolls bridge two adjacent rollers.

3. A live roller conveyor comprising a series of spaced, parallel, laterally disposed rollers forming a planar surface;
   a drive belt positioned above said rollers with its lower drive pass engaging the upper surfaces of said rollers;
   first and second longitudinally extending members on opposite edges of the drive belt defining a channel;
   independent removable pressure members freely riding on said drive pass within said channel and laterally positioned by said members and comprising spaced rolls riding on said drive pass and a frame supporting said rolls in spaced relationship sufficient to bridge at least one roller; and
   means carried by one of said members for engagement by said frames of said pressure members to prevent said pressure members from traveling with said belt.

4. A conveyor according to claim 3 in which said rolls bridge at least two rollers and each roll engages said belt between two adjacent rollers.

5. A conveyor according to claim 3 in which some of said pressure members include means for supporting the return pass of said belt.

* * * * *